US008007028B2

(12) United States Patent
Pencak et al.

(10) Patent No.: US 8,007,028 B2
(45) Date of Patent: Aug. 30, 2011

(54) VEHICLE SLIDING DOOR STRUCTURE

(75) Inventors: Jeffrey G. Pencak, Howell, MI (US);
Naga A. Narayana, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 193 days.

(21) Appl. No.: 12/533,812

(22) Filed: Jul. 31, 2009

(65) Prior Publication Data
US 2011/0025099 A1 Feb. 3, 2011

(51) Int. Cl.
*B60J 5/06* (2006.01)
(52) U.S. Cl. ............................................ 296/155
(58) Field of Classification Search .............. 296/155; 49/360, 425, 213, 49, 411; 16/105
See application file for complete search history.

(56) References Cited

U.S. PATENT DOCUMENTS

| | | | | |
|---|---|---|---|---|
| 4,110,934 A * | 9/1978 | Zens | | 49/218 |
| 4,464,863 A * | 8/1984 | Chikaraishi et al. | | 49/213 |
| 4,651,469 A * | 3/1987 | Ngian et al. | | 49/223 |
| 4,862,640 A * | 9/1989 | Boyko et al. | | 49/213 |
| 4,869,544 A * | 9/1989 | Anwyll et al. | | 296/155 |
| 5,454,618 A * | 10/1995 | Sullivan | | 296/97.22 |
| 5,536,061 A * | 7/1996 | Moore et al. | | 296/155 |
| 5,684,470 A * | 11/1997 | DeLand et al. | | 340/12.5 |
| 5,895,089 A * | 4/1999 | Singh et al. | | 296/207 |
| 6,050,028 A * | 4/2000 | Nishimura et al. | | 49/280 |
| 6,164,015 A * | 12/2000 | Kawanobe et al. | | 49/360 |
| 6,328,374 B1 * | 12/2001 | Patel | | 296/155 |
| 6,340,199 B1 * | 1/2002 | Fukumoto et al. | | 296/155 |
| 6,386,621 B1 * | 5/2002 | Kozak et al. | | 296/155 |
| 6,464,287 B2 * | 10/2002 | Rogers et al. | | 296/155 |
| 6,744,365 B2 | 6/2004 | Sicuranza | | |
| 7,261,364 B2 | 8/2007 | Tanigawa | | |
| 7,341,304 B2 * | 3/2008 | Osada et al. | | 296/155 |
| 7,422,268 B2 | 9/2008 | Kothe et al. | | |
| 7,621,586 B2 * | 11/2009 | Fischer et al. | | 296/155 |
| 7,641,261 B2 * | 1/2010 | Rusnak | | 296/155 |
| 7,654,608 B2 * | 2/2010 | Krajenke et al. | | 296/155 |
| 2002/0151213 A1 * | 10/2002 | Aoki et al. | | 439/502 |
| 2005/0062313 A1 * | 3/2005 | Barczynski et al. | | 296/155 |
| 2008/0034663 A1 | 2/2008 | Houtveen | | |
| 2009/0000200 A1 | 1/2009 | Heuel et al. | | |
| 2009/0107050 A1 * | 4/2009 | Suzuki | | 49/360 |
| 2011/0005140 A1 * | 1/2011 | Guidos et al. | | 49/425 |

* cited by examiner

*Primary Examiner* — Kiran B. Patel
(74) *Attorney, Agent, or Firm* — Global IP Counselors, LLP

(57) ABSTRACT

A vehicle body structure has a first structural member that at least partially defines an upper side of a door opening and a second structural member that extends downward from the first structural member and at least partially defines one side of the door opening. An elongated track member is attached on the first structural member. A sliding door is movably supported on the track member for movement along the track member between a closed position and an open position. A stopper bracket is rigidly attached on the second structural member. The stopper bracket is dimensioned and configured to absorb impacting forces of the sliding door as the sliding door moves from the closed position to the open position. The stopper bracket is rigidly attached to the track member such that the impacting forces are at least partially transmitted to the track member.

20 Claims, 15 Drawing Sheets

VEHICLE SLIDING DOOR STRUCTURE

BACKGROUND OF THE INVENTION

1. Field of the Invention

The present invention relates to a vehicle sliding door structure. More specifically, the present invention relates to sliding door structure that distributes sliding door impacting forces to a plurality of vehicle structural elements.

2. Background Information

For many years, passenger vehicles and commercial vehicles, such as vans, SUVs (sports utility vehicles) large vans and/or panel trucks have been provided with at least one sliding door. Typically, a sliding door slides along a track system provided on or within vehicle structural elements. The sliding door is movable along the track system between a closed position covering a door opening and an open position exposing the door opening. In many vehicles, the door opening is at least partially defined by vehicle structural elements such as a roof rail and a C-pillar. Typically, the roof rail extends in a longitudinal direction along an upper portion of one lateral side of the vehicle structure with at least a section of the roof rail defining an upper side of the door opening. The C-pillar is typically a generally vertical element that extends down from the roof rail. In many vehicles, the C-pillar usually defines a rearward vertical side of the door opening.

The track system typically includes an upper track supporting sliding movement of the sliding door. In many vehicle structures, the upper track is fixed to the roof rail. A stop block or a cushioning mechanism, such as a spring loaded stopper is typically installed on the C-pillar adjacent to the upper track.

Sliding doors are often opened with significant force by vehicle operators who open the door quickly, thereby providing the door with significant speed as it slides. Hence, when the door reaches the open position, the door has appreciable momentum. Upon reaching the open position, the sliding door can slam into the stop block or the cushioning mechanism with considerable impacting force. Over time, the impacting force of the sliding door acting on the stop block and/or the cushioning mechanism can cause the C-pillar to experience high concentrations of stress. Eventually, the C-pillar can experience fatigue and/or undergo some deformation.

In view of the above, it will be apparent to those skilled in the art from this disclosure that there exists a need for an improved vehicle sliding door structure and/or vehicle structure that reduces the high concentrations of stress experienced by the C-pillar that occur from repeated sliding door slamming impact events. This invention addresses this need in the art as well as other needs, which will become apparent to those skilled in the art from this disclosure.

SUMMARY OF THE INVENTION

It has been discovered that in order to reduce the high concentrations of stress experienced by the C-pillar resulting from repeated slamming impacting forces, the impacting forces need to be distributed to additional vehicle structural elements.

In accordance with one aspect of the present invention, a vehicle sliding door structure includes a vehicle body structure, an elongated track member, a sliding door and a stopper bracket. The vehicle body structure has a first structural member that at least partially defines an upper side of a door opening and a second structural member that extends downward from the first structural member and at least partially defines one side of the door opening. The elongated track member is attached on the first structural member. The sliding door is movably supported on the track member for movement along the track member between a closed position at least partially covering the door opening and an open position at least partially exposing the door opening. The stopper bracket is rigidly attached on the second structural member. The stopper bracket is dimensioned and configured to absorb impacting forces of the sliding door as the sliding door moves from the closed position to the open position. The stopper bracket is rigidly attached to the track member such that the impacting forces are at least partially transmitted to the track member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
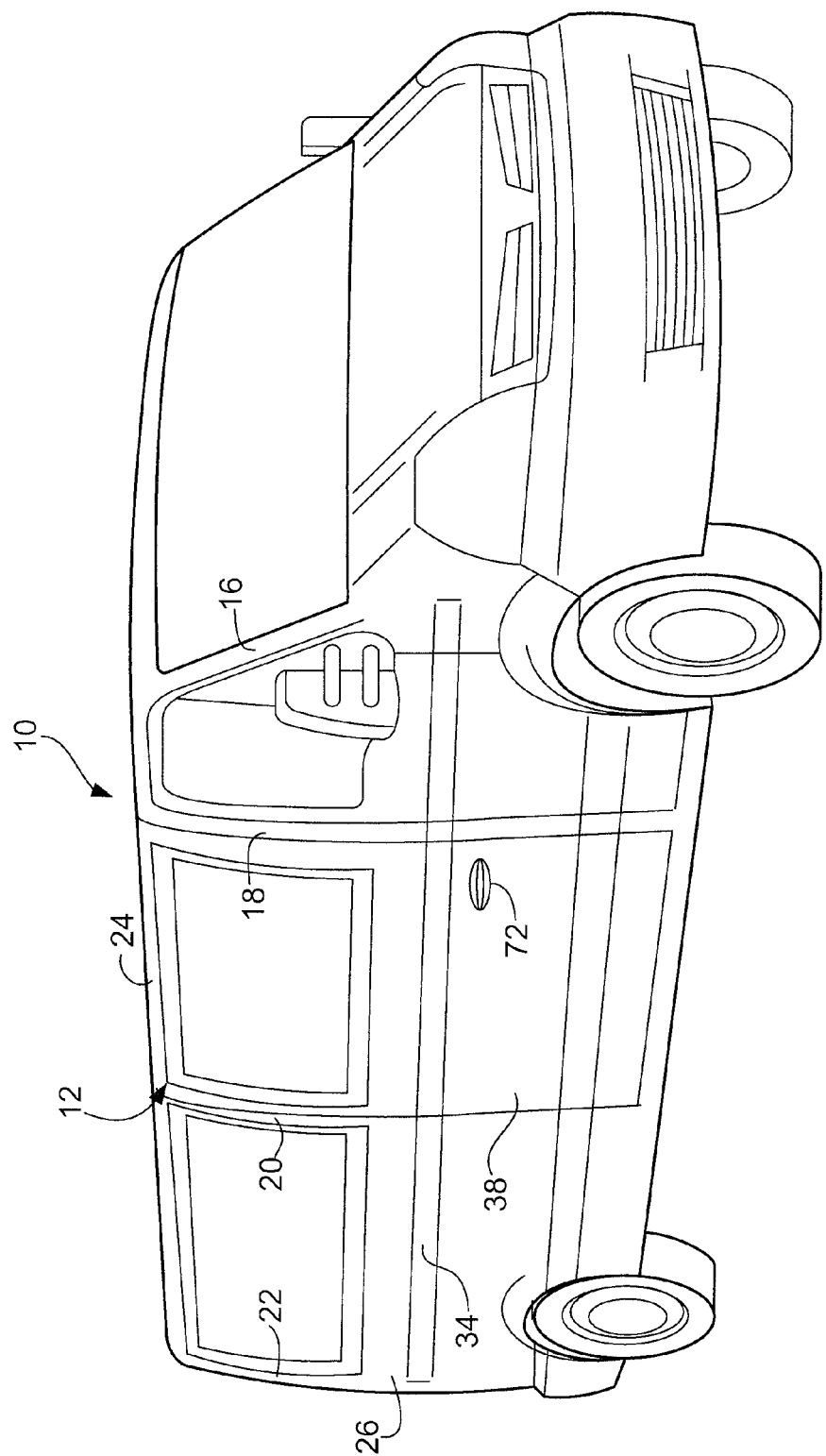
FIG. 1 is a perspective view of a vehicle that includes a sliding door structure, a sliding door, a roof rail and a C-pillar in accordance with the present invention.

Referring initially to FIG. 1, a vehicle 10 with a sliding door structure 12 is illustrated in accordance with a first embodiment of the present invention and described in greater detail below. The sliding door structure 12 of the present invention is configured to distribute impacting forces generated by opening movement of a sliding door to a plurality of vehicle structural elements, as described in greater detail below.

Figure 2:
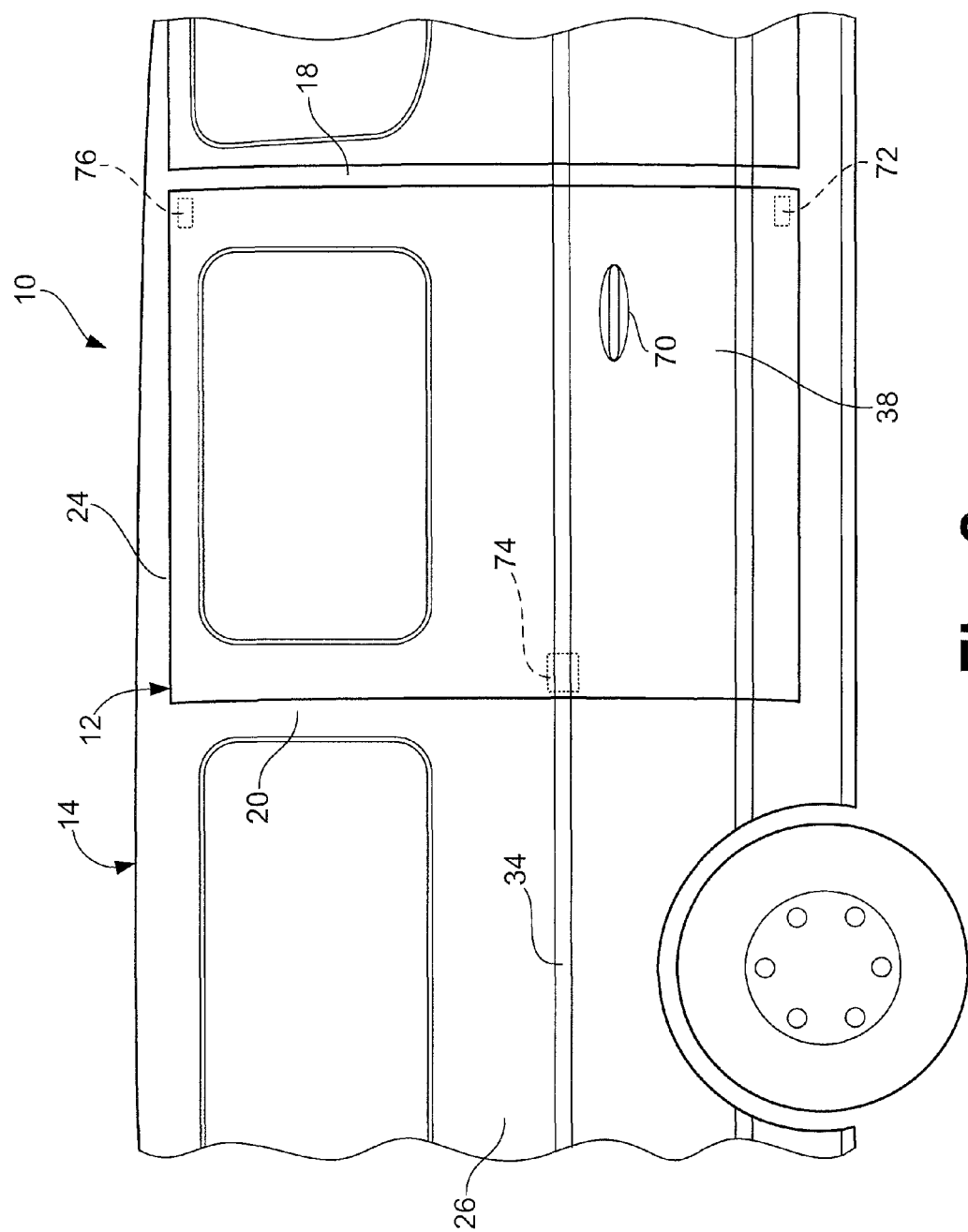
FIG. 2 is a side elevational view of the vehicle showing features of the sliding door in a closed position in accordance with the present invention.
Figure 3:
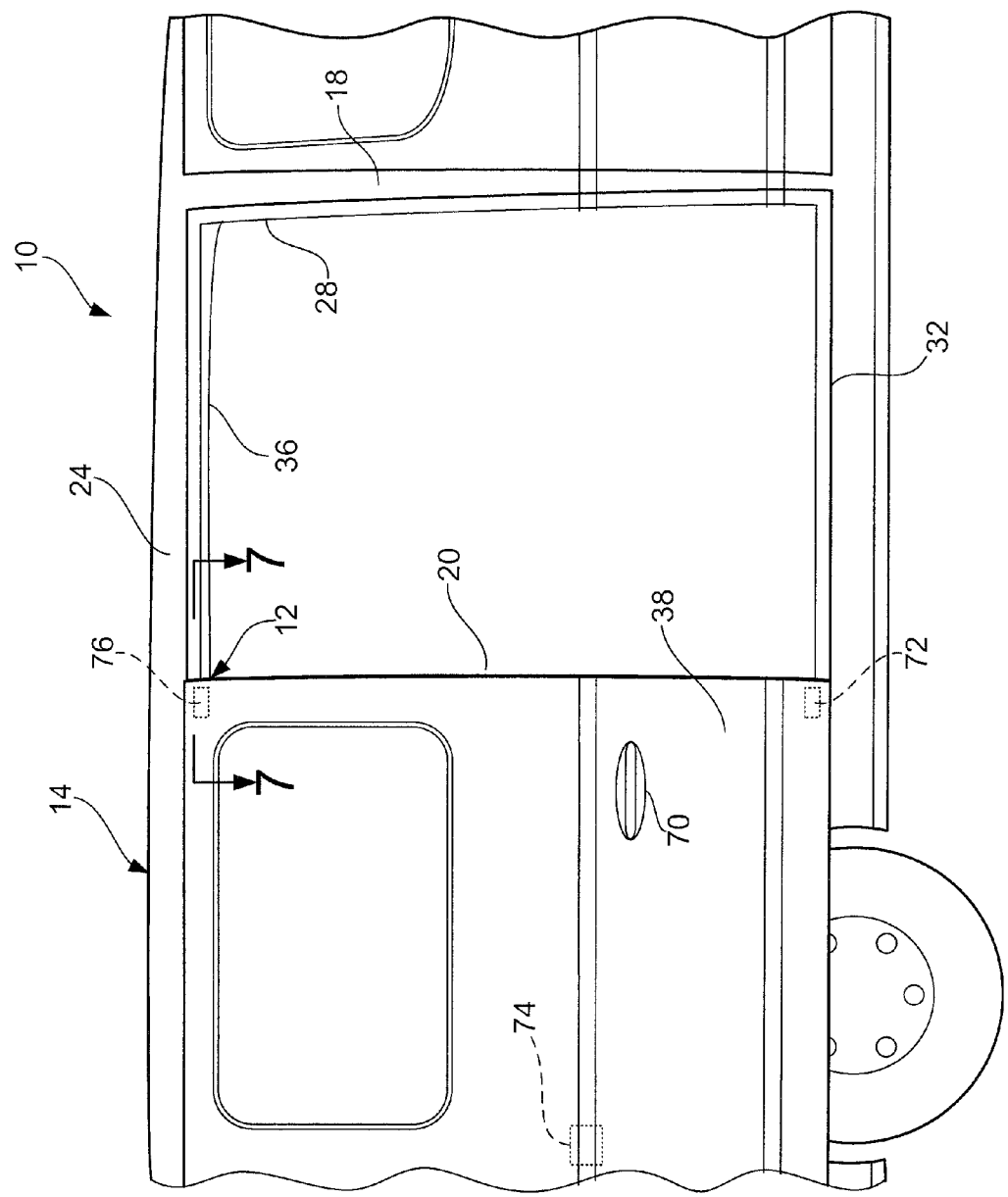
FIG. 3 is another side elevational view of the vehicle similar to FIG. 2, showing the sliding door in an open position, an underside of the roof rail defining a portion of a door opening and a track member fixed to an underside of the roof rail within the door opening in accordance with the present invention.

The vehicle 10 has a vehicle structure 14 that includes, among other things, an A-pillar 16, a B-pillar 18, a C-pillar 20, a D-pillar 22, a roof rail 24 and an outer panel 26. As indicated in FIGS. 2 and 3, the B-pillar 18, the C-pillar 20 and the roof rail 24 at least partially surround and define a door opening 28. Specifically, as shown in FIG. 3, the roof rail 24 (a first structural member) at least partially defines an upper side of a door opening 28. The B-pillar 18 extends downward from the roof rail 24 and at least partially defines one side (a forward side) of the door opening 28. The C-pillar 20 (a second structural member) extends downward from the roof rail 24 and at least partially defines one side (a rearward side) of the door opening 28.

It should be understood from the drawings and the description herein that the door opening 28 can be defined by any of a variety of elements. Specifically, the upper side of the door opening 28 can be defined by any horizontally oriented structural element of the vehicle structure 14. In other words, the sliding door structure 12 can be installed to structural elements other than the roof rail 24. Similarly, the side of the door opening 28 can be defined by any vertically oriented structural element of the vehicle structure 14. Specifically, the sliding door structure 12 of the present invention can be installed to structural elements other than the C-pillar 20.

Figure 7:
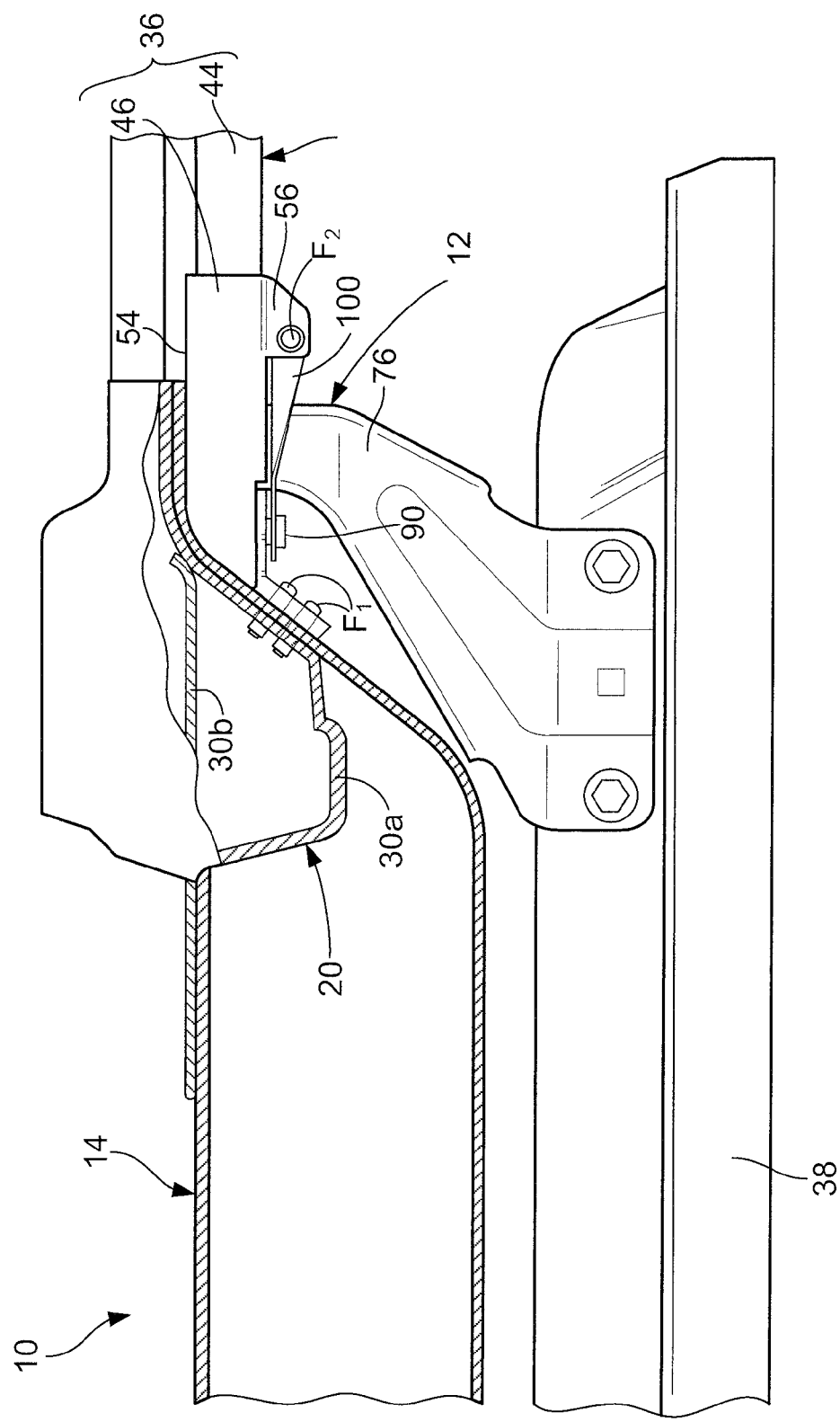
FIG. 7 is a cross-sectional view of the C-pillar taken along the line 7-7 in FIG. 3, with the roof rail removed showing features of the C-pillar and the sliding door structure such as a top surface of the track member and the stopper bracket in accordance with the first embodiment of the present invention.

The A-pillar 16, the B-pillar 18, the D-pillar 22 and the roof rail 24 are preferably at least partially hollow structural elements that are made from a plurality of contoured sheet metal members welded or otherwise rigidly fixed to one another in a conventional manner like the C-pillar 20. For example, as shown in FIG. 7, the C-pillar 20 includes a plurality of contoured sheet-metal elements that define the pillar shape of the C-pillar 20. Specifically, the C-pillar 20 includes an outer pillar portion 30a and an inner pillar portion 30b that are welded to one another defining a hollow area there between. The outer pillar portion 30a and the inner pillar portion 30b are also preferably welded to a forward edge of the vehicle outer panel 26 adjacent to the door opening 28. The A-pillar 16, the B-pillar 18, the C-pillar 20, the D-pillar 22 and the roof rail 24 are all conventional structural elements. Therefore, further description thereof is omitted for the sake of brevity.

The sliding door structure 12 includes a lower track 32, a side panel track 34, a track member 36, a sliding door 38 and a stopper bracket 40. The lower track 32 is located on or within a portion of the vehicle structure 14 beneath the door opening 28. The side panel track 34 is preferably located behind a portion the outer panel 26 of the vehicle structure 14 and can therefore be at least partially hidden from view in FIG. 2. The lower track 32 and the side panel track 34 are conventional track members and therefore further description is omitted for the sake of brevity.

Figure 4:
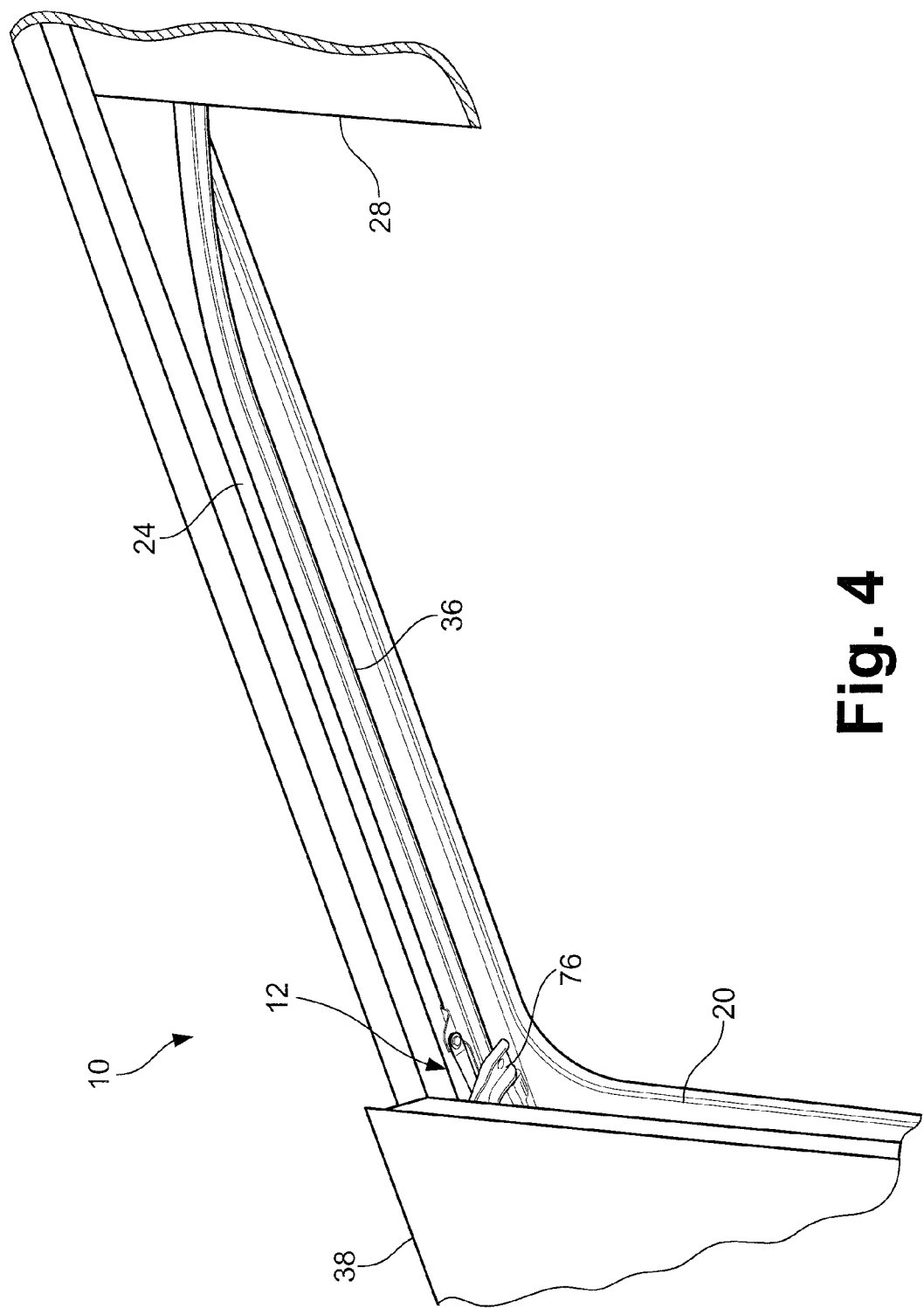
FIG. 4 is a perspective view of a portion of the sliding door structure looking upward, showing (from left to right) an upper forward corner of the sliding door in the open position, the C-pillar defining a rearward edge of the door opening, the roof rail and the track member attached to the underside of the roof rail in accordance with a first embodiment of the present invention.
Figure 5:
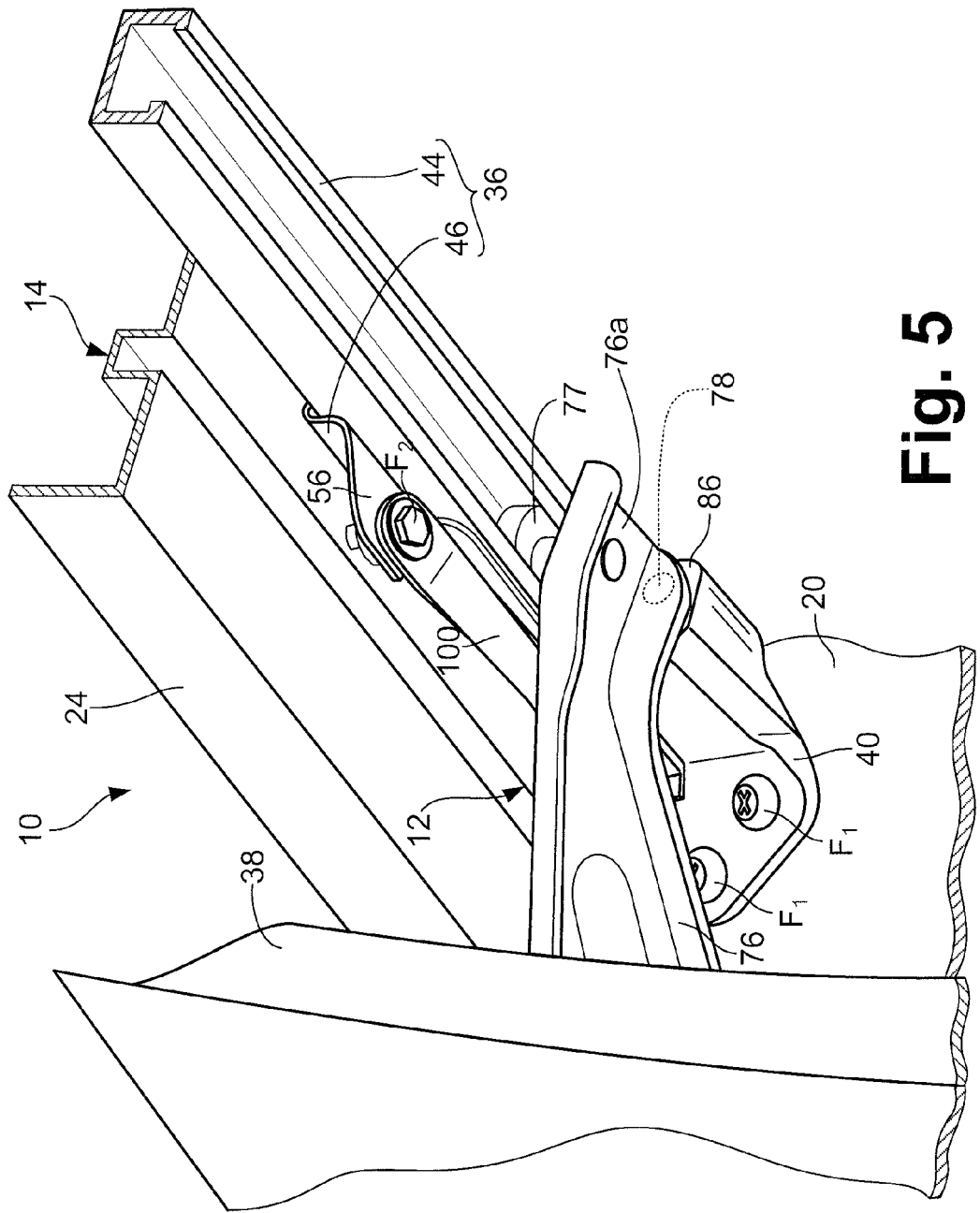
FIG. 5 is another perspective view of a portion of the sliding door structure similar to FIG. 4 but slightly enlarged showing the upper forward corner of the sliding door, an upper portion of the C-pillar, a rear portion of the roof rail, a stopper bracket and the track member in accordance with the first embodiment of the present invention.

As indicated in FIGS. 3, 4 and 5, the track member 36 defines an upper track for the sliding door 38 and is fixedly attached on and extends along the roof rail 24 (the first structural member). Preferably, the track member 36 is welded to an underside of the roof rail 24. Alternatively, the track member 36 can be bolted or otherwise rigidly secured to the underside of the roof rail 24 by conventional fastening elements.

As best shown in FIGS. 6-12, the track member 36 includes a door guiding portion 44 and a projecting portion 46. The door guiding portion 44 is configured to support and guide the sliding door 38 for movement along the track member 36 between a closed position at least partially covering the door opening 28 (shown in FIG. 2) and an open position at least partially exposing the door opening 28 (shown in FIG. 3).

Figure 11:
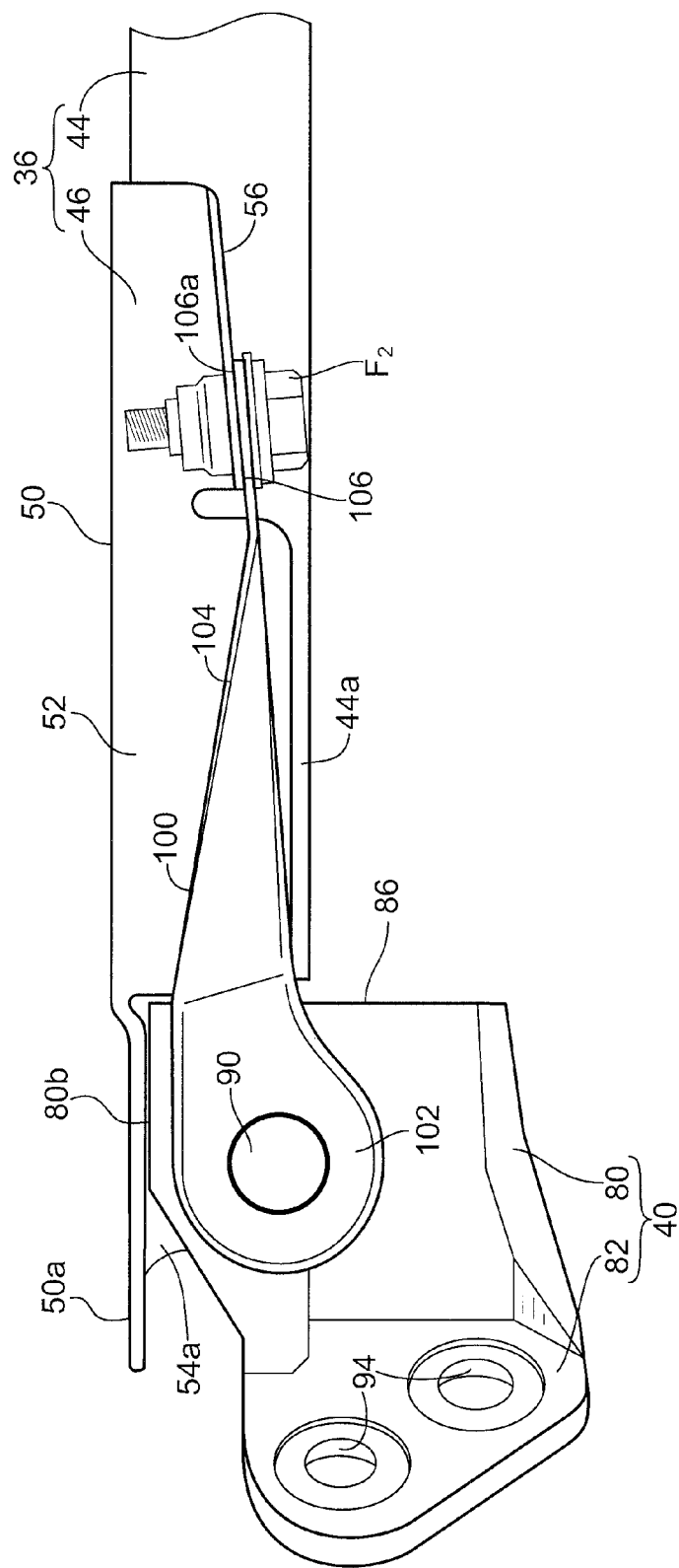
FIG. 11 is a side elevational view of the sliding door structure showing the track member and the stopper bracket with an attached brace and removed from the vehicle in accordance with the first embodiment of the present invention.

The projecting portion 46 is rigidly fixed to the door guiding portion 44. Preferably, the projecting portion 46 is welded to the door guiding portion 44 such that the projecting portion 46 and the door guiding portion 44 form a single, rigid structural element. The projecting portion 46 extends in a longitudinal direction along a rear section 44a of the door guiding portion 44, as indicated in FIGS. 9 and 11.

Figure 10:
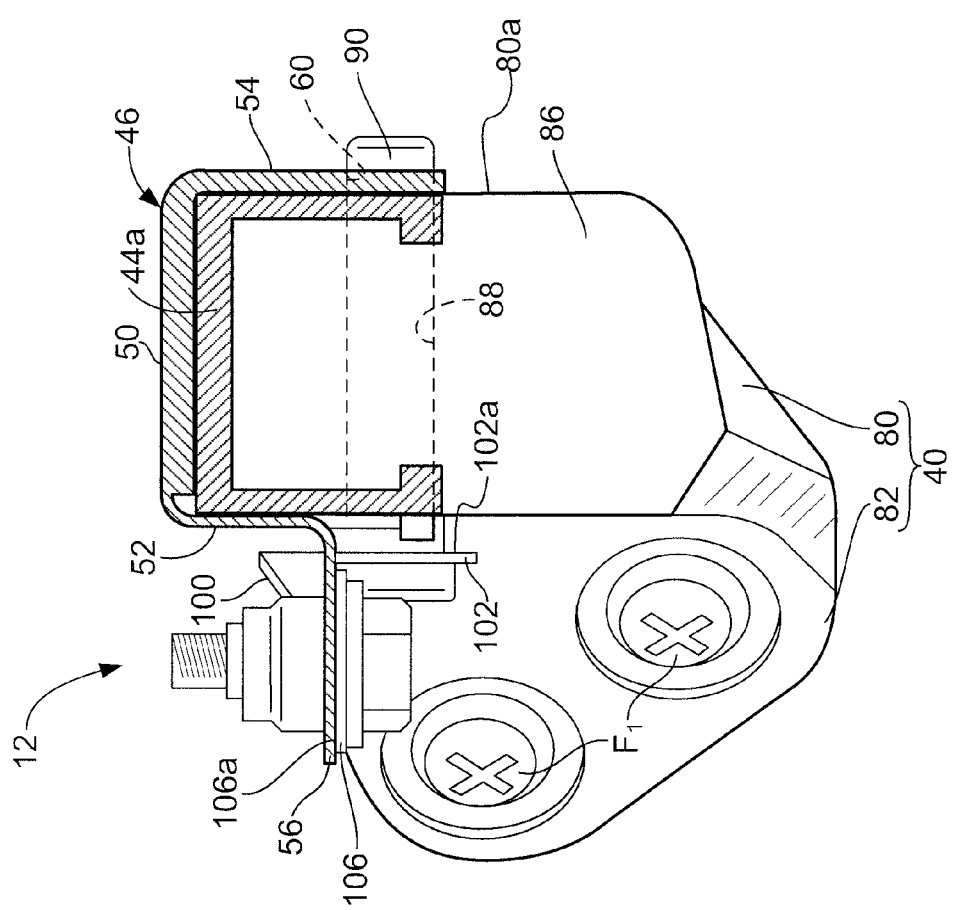
FIG. 10 is a cross-sectional view of the track member taken along the line 10-10 in FIG. 9 showing connections between the stopper bracket and the track member in accordance with the first embodiment of the present invention.
Figure 12:
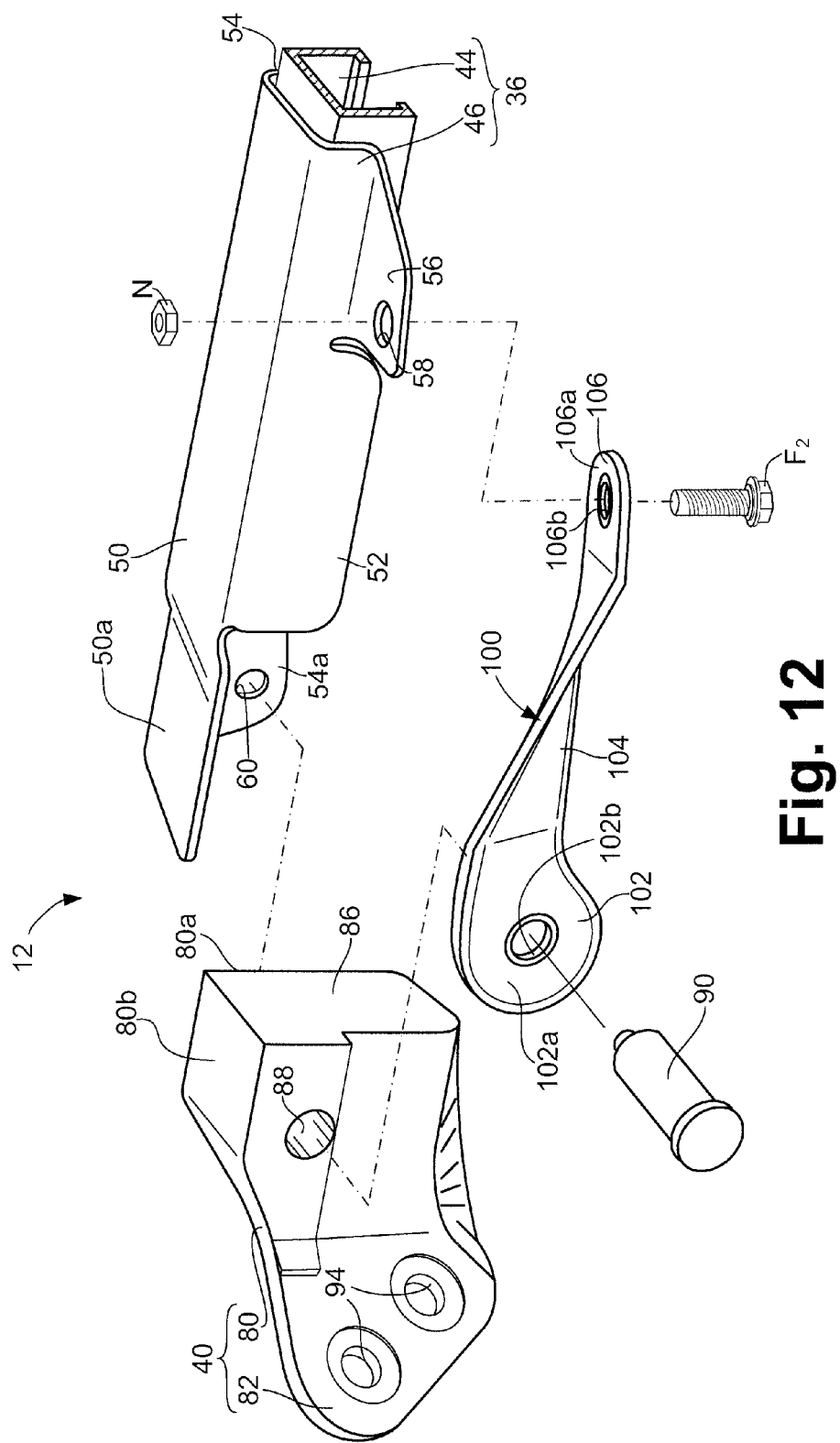
FIG. 12 is an exploded perspective view of the sliding door structure showing the track member, the stopper bracket and the brace removed from the vehicle in accordance with the first embodiment of the present invention.

As best shown in FIGS. 10 and 12, the projecting portion 46 includes a top portion 50, a first side portion 52 and a second side portion 54. The top portion 50, the first side portion 52 and the second side portion 54 preferably form an inverted U-shape when viewed from a forward end, such as in the cross-sectional view in FIG. 10. The top portion 50 of the projecting portion 46 and a top surface of the door guiding portion 44 are preferably also welded to the underside of the roof rail 24, as indicated in FIGS. 3-5. As shown in FIG. 12, the first side portion 52 includes an attachment projection 56 that extends transverse to the first side portion 52, and preferably in a direction perpendicular to the first side portion 52. The attachment projection 56 of first side portion 54 includes an aperture 58 whose purpose is described in greater detail below.

Figure 9:
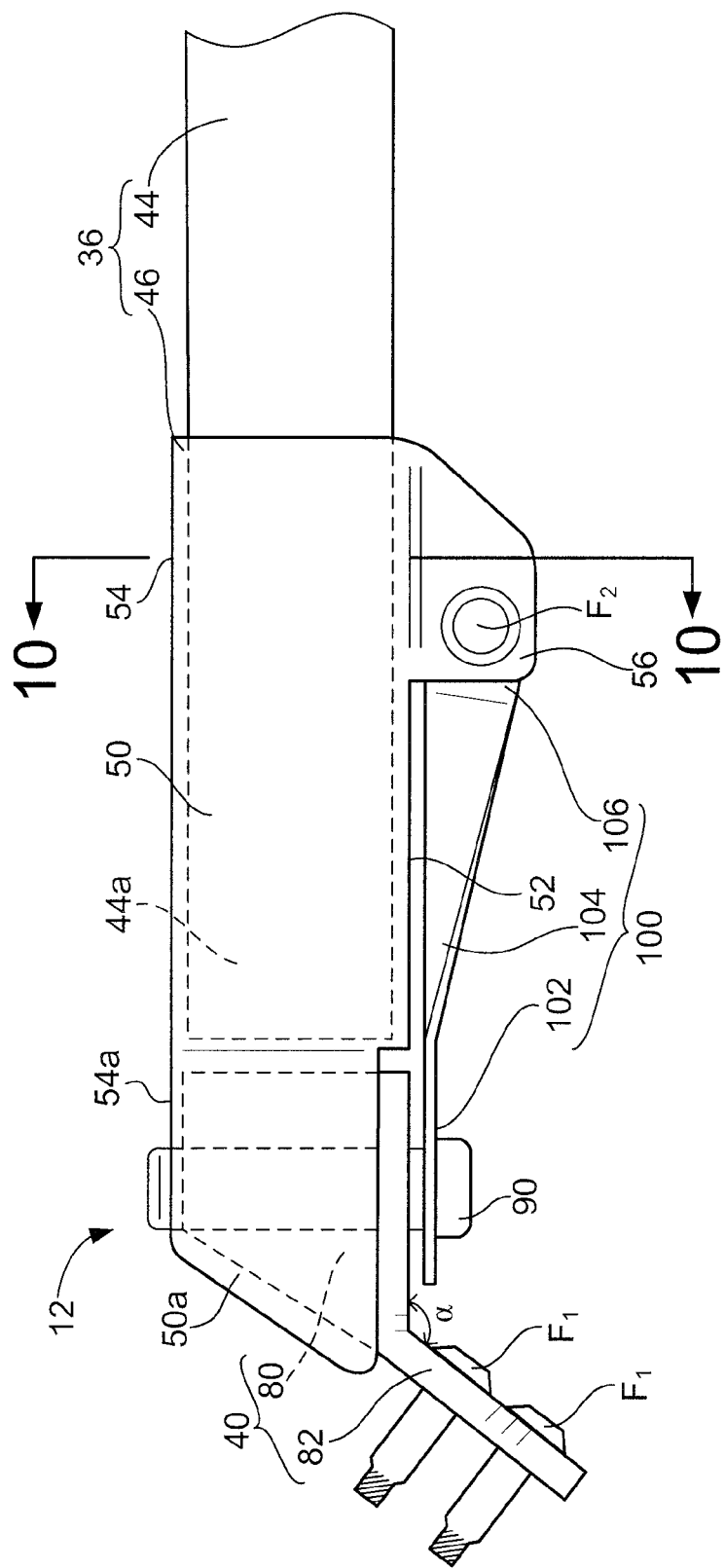
FIG. 9, is a top plan view of the sliding door structure showing the track member and the stopper bracket removed from the vehicle in accordance with the first embodiment of the present invention.

As shown in FIGS. 9 and 12, the top portion 50 and the second side portion 54 are longer than the first side portion 52. Specifically, a rear section 50a of the top portion 50 and a rear section 54a of the second side portion 54 extend rearward beyond the rear section 44a of the door guiding portion 44. The rear section 50a of the top portion 50 and the rear section 54a of the second side portion 54 are dimensioned to extend along the stopper bracket 40, described in greater detail below. The rear section 54a of the second side section 54 includes an aperture 60, whose purpose is described in greater detail below. As best shown in FIG. 12, the overall shape of the rear section 50a of the top portion 50 and the rear section 54a of the second side portion 54 are such that the projecting portion 46 is provided with a cut out area dimensioned to receive the stopper bracket 40.

As best shown in FIGS. 2 and 3, the sliding door 38 includes a latching mechanism 70, a lower support bracket assembly 72, side panel support assembly 74 and an upper support bracket assembly 76. The latching mechanism 70 is a conventional mechanism that allows a person to selectively open and close the sliding door 38. The lower support bracket assembly 72 is configured to engage the lower track 32 such that the lower track 32 supports a portion of the weight of the sliding door 38. The side panel support assembly 74 is configured to engage the side panel track 34 such that a portion of the weight of the sliding door 38 is supported by the side panel track 34. As best shown in FIG. 5, the upper support bracket assembly 76 includes a roller 77 that is engaged within the door guiding portion 44 of the track member 36. Consequently, the lower support bracket assembly 72, the lower track 32, the side panel support assembly 74, the side panel track 34, the upper support bracket assembly 76 and the door guiding portion 44 of the track member 36 co-operate with one another allowing the sliding door 38 to move between the closed position (FIG. 2) and the open position (FIG. 3).

Since the lower support bracket assembly 72, the lower track 32, the side panel support assembly 74 and the side panel track 34 are all conventional features of a sliding door, further description is omitted for the sake of brevity.

Figure 6:
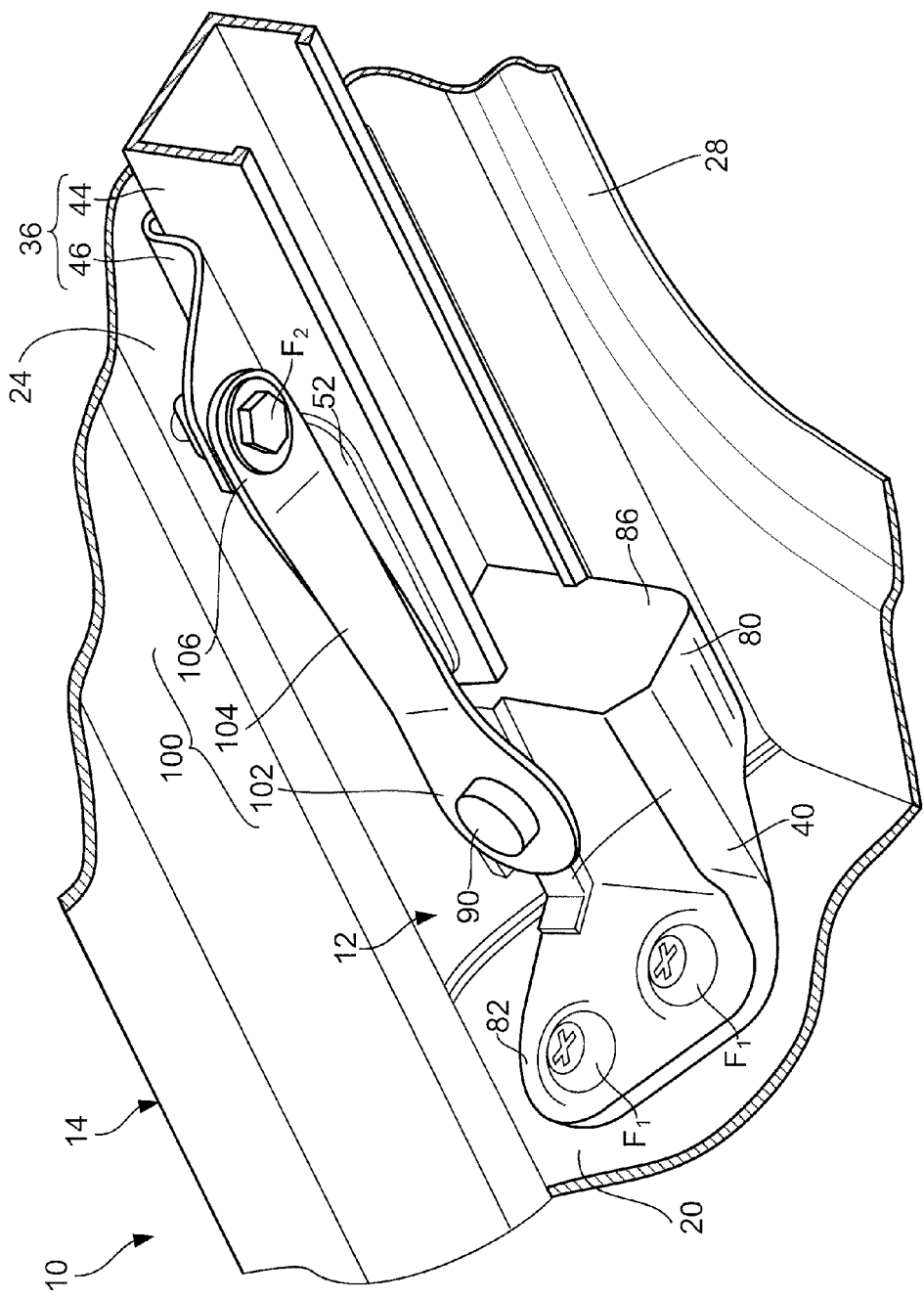
FIG. 6 is another perspective view of a portion of the sliding door structure similar to FIG. 5 further enlarged with the sliding door removed showing the upper portion of the C-pillar, the rear portion of the roof rail, the stopper bracket attached to both the C-pillar and the track member in accordance with the first embodiment of the present invention.

As shown in FIGS. 5 and 6, the stopper bracket 40 is installed within the vehicle structure 14 such that the stopper bracket 40 directly receives slamming or impacting forces resulting from opening movement of the sliding door 38. As best shown in FIG. 5 and 7, an inboard portion 76a of the upper support bracket assembly 76 is aligned with the stopper bracket 40. As indicated in phantom in FIG. 5, the inboard portion 76a preferably includes a cushioning element 78 that cushions any impact between the inboard portion 76a of the upper support bracket assembly 76 and the stopper block 40.

Hence, when the sliding door 38 is moved quickly from the closed position to the open position, the upper support bracket assembly 76 of the sliding door 38 impacts or slams into the stopper bracket 40. The stopper bracket 40 is positioned with respect to the vehicle structure 14 and installed such that the slamming or impacting forces are distributed between the C-pillar 20 and the roof rail 24, as described in greater detail below.

As best shown in FIGS. 6, 10 and 12, the stopper bracket 40 includes a stop block portion 80 and an attachment end 82. The stop block portion 80 is connected to the projecting portion 46 of the track member 36 and the attachment end 82 is secured on the C-pillar 20 (the second structural member).

As best shown in FIGS. 10, 11 and 12, the stop block portion 80 of the stopper bracket 40 includes an inboard surface 80a (FIG. 10 only), an upper surface 80b, a stop surface 86 and an aperture 88. The inboard surface 80a, the upper surface 80b and the stop surface 86 are preferably perpendicular to one another. Further, with the stopper bracket 40 installed in the vehicle 10, the stopper bracket 40 engages the projecting portion 46 of the track member 36. Specifically, as indicated in FIG. 10, a portion of the inboard surface 80a of the stop block portion 80 contacts the rear section 54a of the second side portion 54. As indicated in FIGS. 10 and 11, the upper surface 80b of the stop block portion 80 contacts the rear section 50a of the top portion 50 of the projecting portion 46 of the track member 36.

The stop surface 86 is dimensioned such that when the sliding door 38 is moved to the opened position, the cushioning element 78 on the inboard portion 76a of the upper support bracket assembly 76 contacts and/or impacts the stop surface 86 of the stopper bracket 40. In other words, the stop surface 86 is dimensioned to directly receive the slamming or impacting forces of the sliding door 38 when the sliding door 38 is moved from the closed position to the open position.

The aperture 88 is preferably a bore that extends through the stop block portion 80 of the stopper bracket 40. The aperture 88 extends from an outboard side of the stop block portion 80 to the inboard surface 80a. The aperture 88 is dimensioned to receive a pin 90 in a press-fit or forced engagement. When the stopper bracket 40 is installed to the sliding door structure 12 and the vehicle structure 14, the stop block portion 80 extends in a direction aligned with a longitudinal direction of the track member 36, as indicated in FIGS. 6, 10 and 12.

As best shown in FIGS. 7 and 9, the attachment end 82 of the stopper bracket 40 extends in a direction angularly offset from the stop block portion 80. Specifically, the attachment end is angularly offset from the stop block portion 80 by an angle α that is between 90-160 degrees. However in the depicted embodiment the angle α is approximately 130 degrees. The attachment end 82 also includes a pair of apertures 94, as shown in FIG. 12. Fasteners $F_1$ are inserted into the apertures 94 and engage corresponding threaded fastener elements fixed to an inward side of the outer pillar portion 30a of the C-pillar 20 (the second structural member). Hence, the stopper bracket 40 is removably secured to the outer panel portion 30a of the C-pillar 20.

Figure 8:
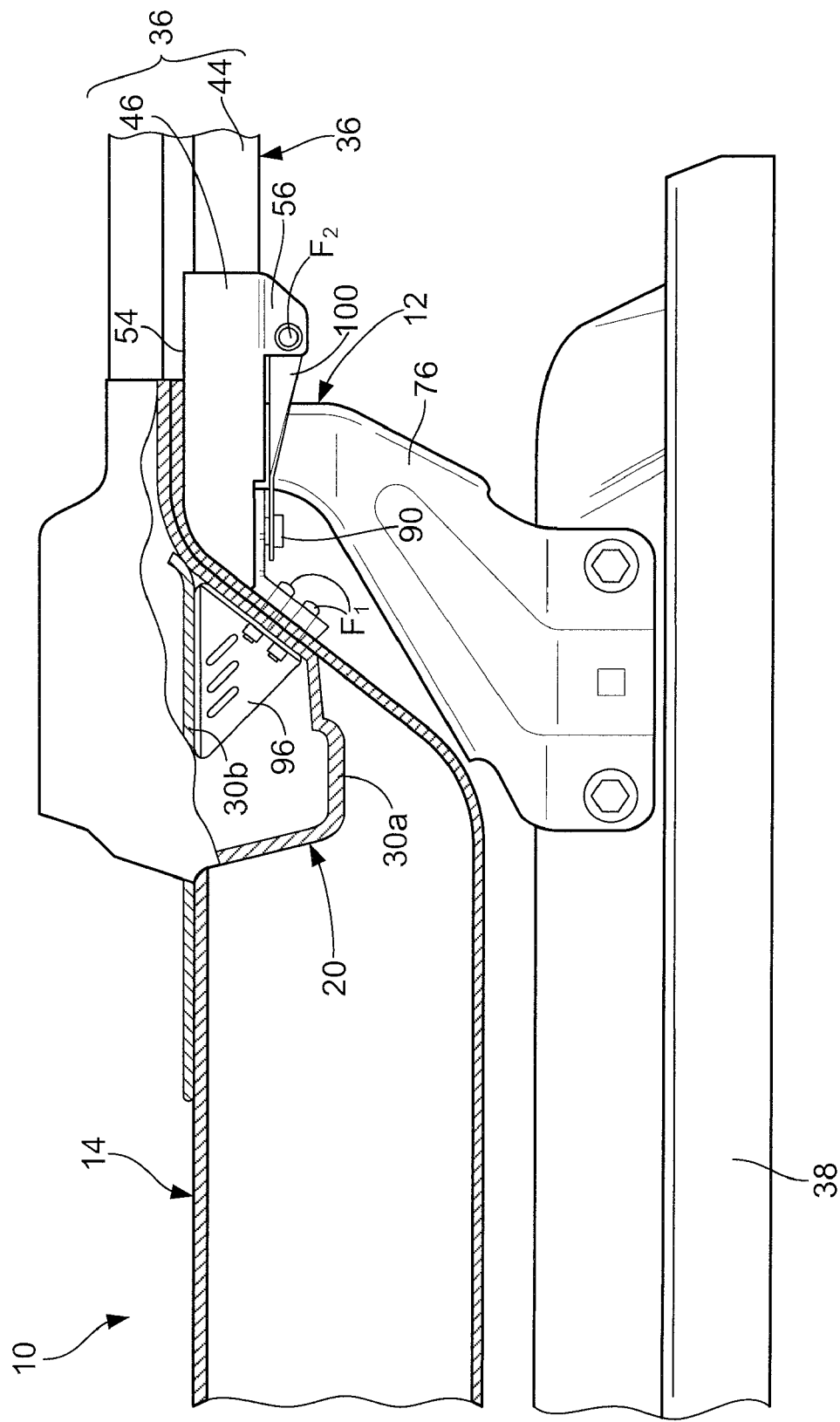
FIG. 8 is a cross-sectional view of the C-pillar similar to FIG. 7, with the roof rail removed showing features of the C-pillar and the sliding door structure such as the top surface of the track member and the stopper bracket and additionally showing an optional reinforcement bracket installed within the C-pillar, in accordance with the first embodiment of the present invention.

Alternatively, the C-pillar 20 can be provided with a reinforcing bracket 96 that extends between the outer pillar portion 30a and the inner pillar portion 30b, as shown in FIG. 8. More specifically, the C-pillar 20 (the second structural member) can optionally include the reinforcing bracket 96 disposed within a hollow interior thereof. The reinforcing bracket 96 is fixedly attached on respective opposing surfaces of the inner pillar portion 30b (an inner panel of the C-pillar 20) and the outer pillar portion 30a (an outer panel of the C-pillar 20). The reinforcing bracket 96 is located at a height within the C-pillar 20 such that the reinforcing bracket 96 is vertically aligned with the stopper bracket 40. The fasteners $F_1$ are removable from the stopper bracket 40, the C-pillar 20 and the reinforcing bracket 96. Consequently, the stopper bracket 40 is removably attached to both the outer pillar portion 30a (the outer panel) of the C-pillar 20 and the reinforcing bracket 96.

As shown in FIGS. 5-12, the stopper bracket 40 also includes a brace 100 having a first end 102, a mid-section 104 and a second end 106. The first end 102 is fixedly attached to the stopper bracket 40 and the second end 106 is fixedly attached to the track member 36. The mid-section 104 of the brace 100 includes a twisted shape such that the first end 102 of the brace 100 has a stopper bracket facing surface 102a and the second end 106 of the brace 100 has a track member facing surface 106a that is angularly offset from the stopper bracket facing surface 102a. In the depicted embodiment, the stopper bracket facing surface 102a is approximately perpendicular to the track member facing surface 106a.

The first end 102 of the brace 100 and the stopper bracket 40 are fixed to one another by the pin 90. As indicated in FIGS. 10 and 12, the pin 90 is inserted through an aperture 102b formed in the first end 102. The pin 90 also extends into the aperture 88 in the stop block portion 80 of the stopper bracket 40. The pin 90 further extends through the aperture 60 in the rear section 54a of the second side portion 54 of the projecting portion 46 of the track member 36. The pin 90 is preferably press-fitted or force fitted into the aperture 88 in the stop block portion 80 of the stopper bracket 40. However, the pin 90 can also be provided with machine threads that mate with corresponding machine threads in the aperture 88 of the stop block portion 80 of the stopper bracket 40 and/or the aperture 60 in the rear section 54a of the second side portion 54 of the projecting portion 46 of the track member 36.

As is also indicated in FIG. 12, the second end 106 of the brace 100 and the track member 36 are fixed to one another by a fastener $F_2$. Specifically, the fastener $F_2$ is inserted through an aperture 106b of the second end 106 of the brace 100 and then through the aperture 58 in the attachment projection 56 of the first side portion 52 of the projecting portion 46 of the track member 36. A mating threaded fastener portion, or nut N, fixes the fastener $F_2$ in place.

Hence, the stopper bracket 40 is rigidly attached to the track member 36 by the pin 90 and attachment to the brace 100 such that the slamming or impacting forces from the sliding door 38 are at least partially transmitted to the track member 36. Since the track member 36 is rigidly fixed to the roof rail 24 by, for example, welding, the slamming or impacting forces from the sliding door 38 are also at least partially transmitted to the roof rail 24. Thus, impacting forces from the sliding door 38 on the stopper bracket 40 are transmitted to a plurality of vehicle structural elements. Specifically, impacting forces from the sliding door 38 on the stopper bracket 40 are transmitted to both the C-pillar 20 and the roof rail 24.

Second Embodiment

Figure 13:
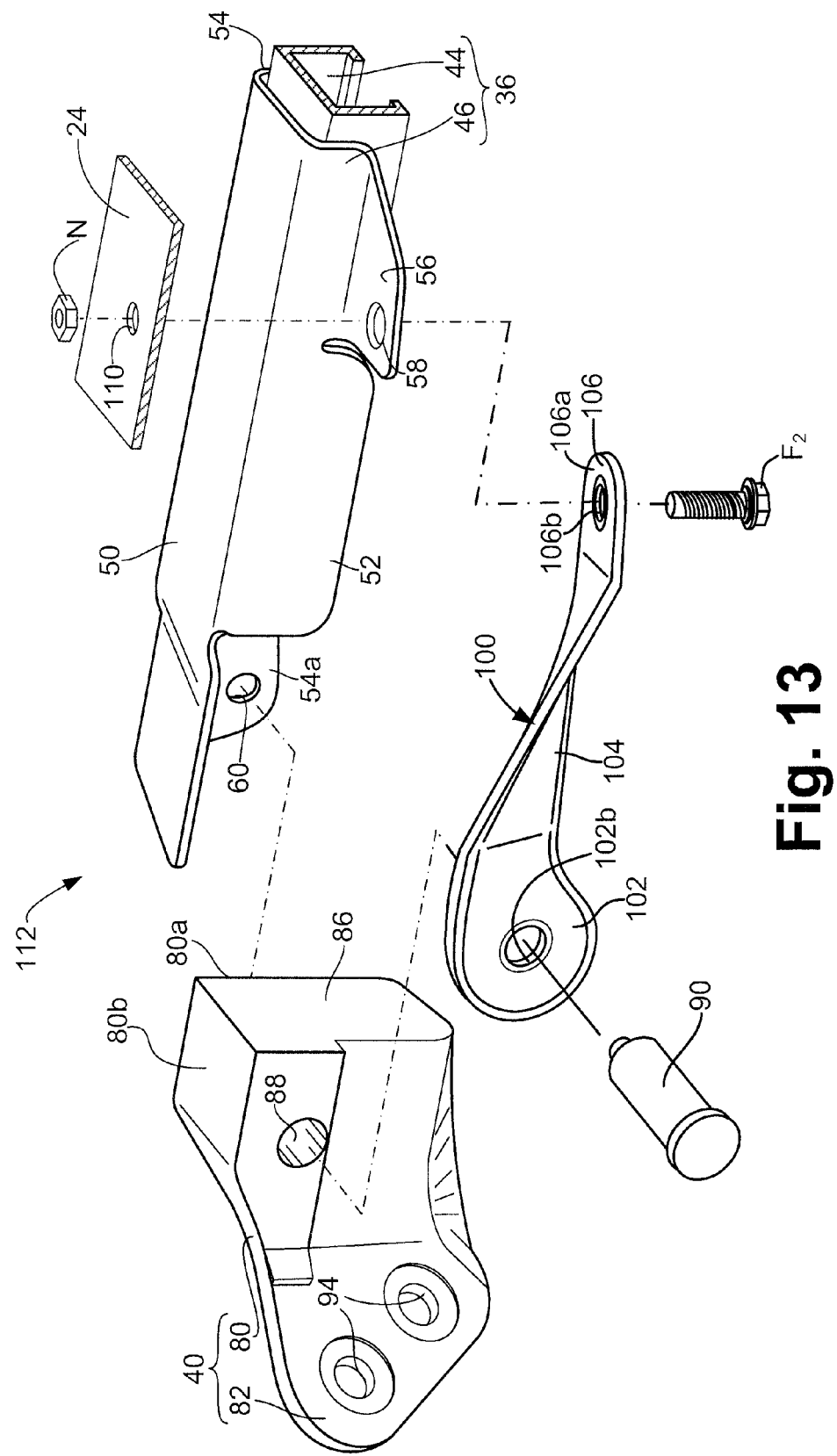
FIG. 13 is an exploded perspective view of a sliding door structure showing the track member, the stopper bracket and the brace removed from the vehicle in accordance with a second embodiment of the present invention.

Referring now to FIG. 13, a sliding door structure 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the track member 36 and stopper bracket 40 are identical to the first embodiment. The track member 36 includes the door guiding portion 44 and the projecting portion 46. However, in the second embodiment, the roof rail 24 is provided with an aperture 110 and the nut N, as shown in FIG. 13. The fastener $F_2$ is installed in a manner similar to the first embodiment. Specifically, the fastener $F_2$ is installed through the aperture 106b of the brace 100, through the aperture 58 of the attachment projection 56 of the first side portion 52 of the attachment projection 56 and further extends through the aperture 110 and the nut N.

Thus, in the second embodiment, the stopper bracket 40 is directly connected to the C-pillar 20 (as in the first embodiment) and further to both the track member 36 and to the roof rail 24.

Third Embodiment

Figure 14:
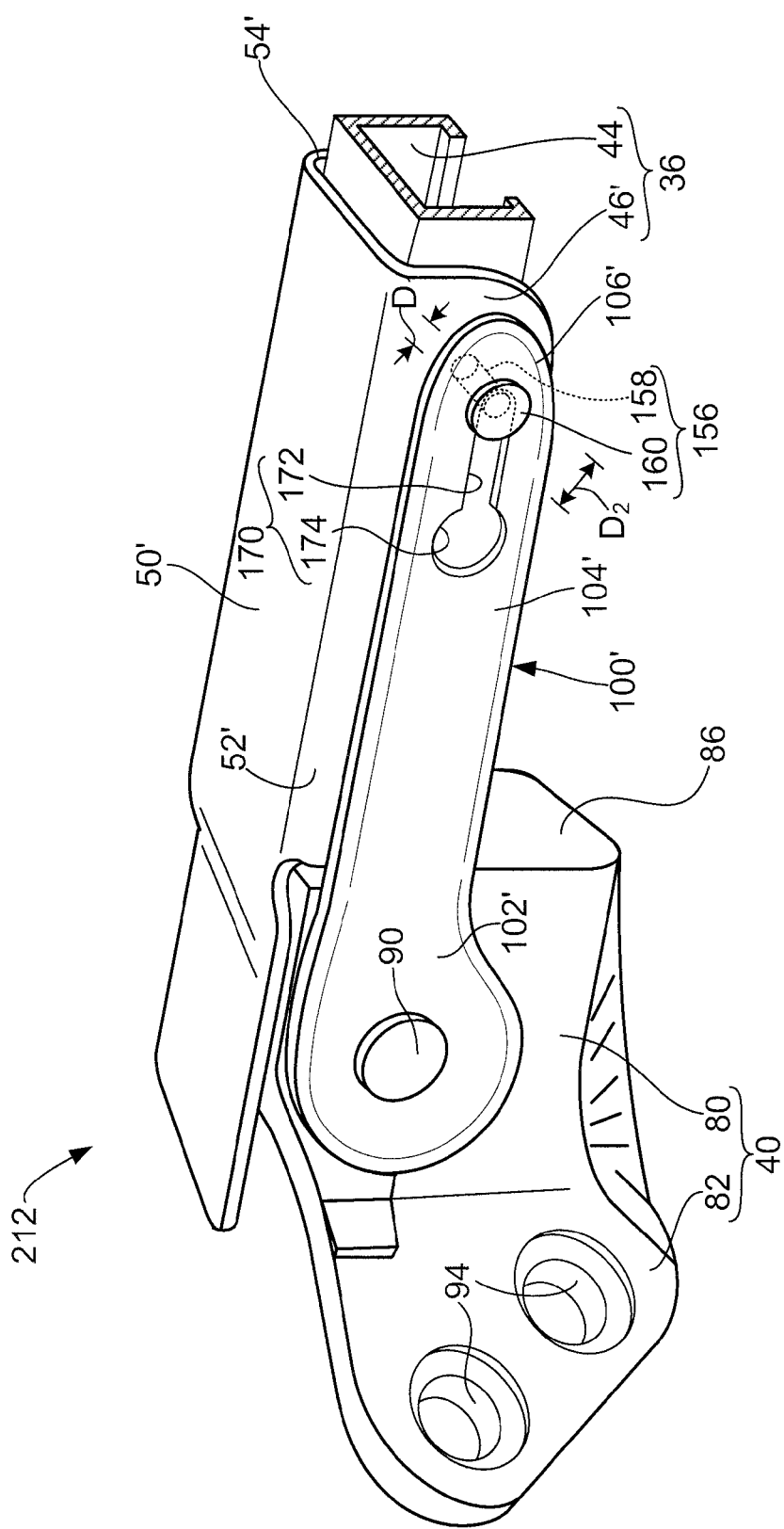
FIG. 14 is a perspective view of the sliding door structure showing a track member, the stopper bracket and a brace removed from the vehicle in accordance with a third embodiment of the present invention.

Referring now to FIG. 14, a sliding door structure 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (').

In the third embodiment, stopper bracket 40 is identical to the first embodiment. However, the track member 36 of the first embodiment has been replaced with a track member 36'. The track member 36' includes the door guiding portion 44 of the first embodiment, but has a modified projecting portion 46'. The modified projecting portion 46' includes the top portion 50 and the second side portion 54 with the aperture 60 of the track member 36 of the first embodiment. However, the modified projecting portion 46' includes a first side portion 52' with attachment projection that is in the form of an attachment pin 156 that is fixedly attached to the first side portion 52'. The attachment pin 156 includes a shaft portion 158 having a first diameter $D_1$ and a head portion 160 having a second diameter $D_2$ larger than the first diameter $D_1$.

In the third embodiment, the brace 100 of the first embodiment has been replaced with a brace 100' that includes a first end 102' fixed to the stopper bracket 40 by the pin 90. The brace 100' also has a second end 106' that has an elongated aperture 170 having a first section 172 and a second section 174. The first section 172 has a diameter smaller than the second diameter $D_2$ of the attachment pin 156 and larger than the first diameter $D_1$ of the attachment pin 156. The second section 174 has a diameter at least as large as the second diameter $D_2$.

The configuration of the brace 100' and the attachment pin 156 facilitate simple installation of the sliding door structure 212.

Fourth Embodiment

Figure 15:
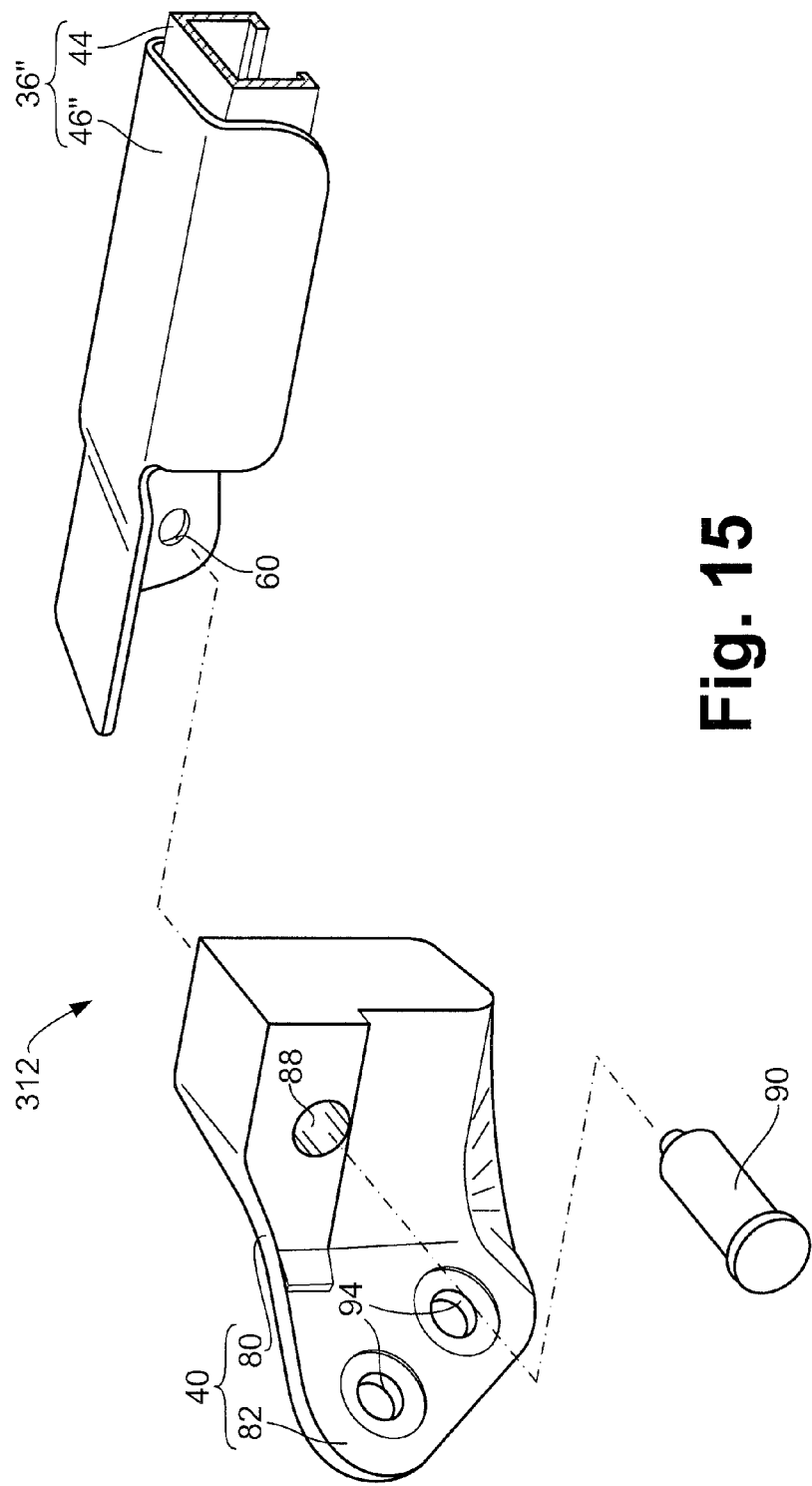
FIG. 15 is an exploded perspective view of a sliding door structure showing a track member and the stopper bracket removed from the vehicle in accordance with a fourth embodiment of the present invention.

Referring now to FIG. 15 a sliding door structure 312 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the fourth embodiment, stopper bracket 40 is identical to the first embodiment. However, the track member 36 of the first embodiment has been replaced with a track member 36". The track member 36" includes the door guiding portion 44 of the first embodiment, but has a modified projecting portion 46". The modified projecting portion 46" includes the top portion 50, the second side portion 54 and the aperture 60 of the first embodiment. However, in the fourth embodiment, the brace 100 has been completely eliminated.

In the fourth embodiment, the stopper bracket 40 is fixed to the track member 36" by the pin 90 which is inserted into the aperture 88 of the stopper block 40 and further into the aperture 60 of the second side portion 54 of the track member 36". This embodiment is simpler that the first, second and third embodiments and uses fewer parts. Even with the reduction in parts, impacting forces from the sliding door 38 on the stopper bracket 40 are transmitted to both the C-pillar 20 and the roof rail 24.

The various elements of the vehicle 10 and the sliding door 38 are conventional components that are well known in the art. Since these elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

LIST OF REFERENCE NUMERALS:

A vehicle 10
  a sliding door structure 12
  a vehicle body structure 14

LIST OF REFERENCE NUMERALS:

an A-pillar 16
  a B-pillar 18
  a C-pillar 20 (a second structural member)
    an outer pillar portion 30a
    an inner pillar portion 30b
    reinforcing bracket 96
  a D-pillar 22
  a roof rail 24 (a first structural member)
  an outer panel 26
  a door opening 28
The sliding door structure 12
  a lower track 32
  a side panel track 34
  a track member 36
  a sliding door 38
  a stopper bracket 40
The track member 36
  a door guiding portion 44
  a projecting portion 46
    a top portion 50
      rear section 50a
    a first side portion 52
      an attachment projection 56
        an aperture 58
    a second side portion 54
      rear section 54a
        an aperture 60
The sliding door 38
  a latching mechanism 70
  a lower support bracket assembly 72
  a side panel support assembly 74
  an upper support bracket assembly 76
    inboard portion 76a
    a roller 77
    a cushioning element 78
The stopper bracket 40
  a stop block portion 80
    inboard surface 80a
    upper surface 80b
    a stop surface 86
    an aperture 88
      a pin 90
  an attachment end 82
    an angle $\alpha$
    a pair of apertures 94
      a pair of fasteners $F_1$
  a brace 100
    a first end 102
      a stopper bracket facing surface 102a
      aperture 102b
    a mid-section 104
    a second end 106
      a track member facing surface 106a
      an aperture 106b
      fastener $F_2$

What is claimed is:

1. A vehicle sliding door structure comprising:

a vehicle body structure having a first structural member that at least partially defines an upper side of a door opening and a second structural member that extends downward from the first structural member and at least partially defines one side of the door opening;

an elongated track member attached on the first structural member;

a sliding door movably supported on the track member for movement along the track member between a closed position at least partially covering the door opening and an open position at least partially exposing the door opening; and a stopper bracket rigidly attached on the second structural member, the stopper bracket being dimensioned and configured to absorb impacting forces of the sliding door as the sliding door moves from the closed position to the open position, the stopper bracket being rigidly attached to the track member such that the impacting forces are at least partially transmitted to the track member.

2. The vehicle sliding door structure according to claim 1, further comprising
a brace having a first end fixedly attached to the stopper bracket and a second end fixedly attached to the track member.

3. The vehicle sliding door structure according to claim 2, wherein
the second end of the brace is fixedly attached to the first structural member and the track member.

4. The vehicle sliding door structure according to claim 2, wherein
the first end of the brace has a stopper bracket facing surface, and the second end of the brace has a track member facing surface.

5. The vehicle sliding door structure according to claim 4, wherein
the stopper bracket facing surface is angularly offset from the track member facing surface.

6. The vehicle sliding door structure according to claim 2, wherein
the track member includes an attachment projection extending therefrom transverse to a longitudinal length thereof, and
the second end of the brace is removably attached to the attachment projection of the track member.

7. The vehicle sliding door structure according to claim 6, wherein
the attachment projection includes an attachment pin fixedly attached thereto and the second end of the brace has an elongated aperture configured to removably engage the attachment pin.

8. The vehicle sliding door structure according to claim 2, wherein
the track member includes an attachment pin fixedly attached thereto and the second end of the brace has an elongated aperture configured to removably engage the attachment pin.

9. The vehicle sliding door structure according to claim 2, wherein
the first end of the brace and the stopper bracket are fixed to one another by a first fastener and the second end of the brace and the track member are fixed to one another by a second fastener.

10. The vehicle sliding door structure according to claim 1, wherein
the track member includes a door guiding portion slidably supporting the sliding door and a projecting portion, the projecting portion extending in a longitudinal direction from one end of the door guiding portion with the stopper bracket being attached to the projecting portion by a fastener.

11. The vehicle sliding door structure according to claim 1, wherein
the stopper bracket includes a stop block portion connected to the track member and an attachment end secured on the second structural member.

12. The vehicle sliding door structure according to claim 11, wherein
the stop block portion extends in a direction aligned with a longitudinal direction of the track member, and
the attachment end of the stopper bracket extends in a direction angularly offset from the stop block portion.

13. The vehicle sliding door structure according to claim 11, further comprising
a brace having a first end fixedly attached to the stopper bracket and a second end fixedly attached to the track member and the first structural member.

14. The vehicle sliding door structure according to claim 13, wherein
the first end of the brace has a stopper bracket facing surface, and the second end of the brace has a track member facing surface contacting the track member with the track member facing surface being angularly offset from the stopper bracket facing surface.

15. The vehicle sliding door structure according to claim 1, wherein
the second structural member includes an inner panel and an outer panel fixedly attached to one another defining a structural pillar having a hollow interior with the stopper bracket being secured to the outer panel.

16. The vehicle sliding door structure according to claim 15, wherein
the second structural member includes a reinforcing bracket disposed within the hollow interior fixedly attached on respective opposing surfaces of the inner panel and the outer panel.

17. The vehicle sliding door structure according to claim 16, wherein the stopper bracket is removably attached to both the outer panel and the reinforcing bracket.

18. The vehicle sliding door structure according to claim 2, wherein
the second structural member includes an inner panel and an outer panel fixedly attached to one another defining a structural pillar having a hollow interior with the stopper bracket being secured to the outer panel.

19. The vehicle sliding door structure according to claim 18, wherein
the second structural member includes a reinforcing bracket disposed within the hollow interior fixedly attached on respective opposing surfaces of the inner panel and the outer panel.

20. The vehicle sliding door structure according to claim 2, wherein
the stopper bracket includes a stop surface configured to receive impacting forces from a portion of the sliding door, the stop surface defining a plane, and wherein the first end of the brace is attached to the stopper bracket on a first side of the plane, and the second end of the brace is attached to the track member on a second side of the plane.

* * * * *